US010521096B2

(12) United States Patent
Chapman et al.

(10) Patent No.: US 10,521,096 B2
(45) Date of Patent: Dec. 31, 2019

(54) VIRTUAL REALITY EXPERIENCE CONTROL SYSTEM

(71) Applicant: Disney Enterprises, Inc., Burbank, CA (US)

(72) Inventors: Steven Chapman, Thousand Oaks, CA (US); Mehul Patel, Stevenson Ranch, CA (US); Calis Agyemang, Los Angeles, CA (US); Joseph Popp, Cerritos, CA (US)

(73) Assignee: Disney Enterprises, Inc., Burbank, CA (US)

( * ) Notice: Subject to any disclaimer, the term of this patent is extended or adjusted under 35 U.S.C. 154(b) by 156 days.

(21) Appl. No.: 15/658,319

(22) Filed: Jul. 24, 2017

(65) Prior Publication Data

US 2019/0026014 A1 Jan. 24, 2019

(51) Int. Cl.
*G06F 3/0484* (2013.01)
*G06F 3/01* (2006.01)
*G06T 11/60* (2006.01)
*G06F 3/0481* (2013.01)
*G02B 27/00* (2006.01)

(52) U.S. Cl.
CPC ......... *G06F 3/04847* (2013.01); *G02B 27/00* (2013.01); *G06F 3/011* (2013.01); *G06F 3/017* (2013.01); *G06F 3/04815* (2013.01); *G06F 3/04845* (2013.01); *G06T 11/60* (2013.01); *G06T 2200/24* (2013.01)

(58) Field of Classification Search
CPC .................................................. G06F 3/04847
USPC ......................................................... 715/778
See application file for complete search history.

(56) References Cited

U.S. PATENT DOCUMENTS

| 2016/0063762 A1* | 3/2016 | Heuvel | G06F 3/011 345/633 |
| 2018/0247676 A1* | 8/2018 | Raphael | G11B 31/006 |

* cited by examiner

*Primary Examiner* — Shawn S Joseph
(74) *Attorney, Agent, or Firm* — Patent Ingenuity, P.C.; Samuel K. Simpson (57) ABSTRACT

A virtual reality system has a virtual reality headset having an interior display screen that displays a virtual reality environment. Further, the virtual reality headset has a receiver, in operable communication with the virtual reality headset, that receives one or more user inputs from a user immersed in the virtual reality environment when wearing the virtual reality headset. In addition, the virtual reality headset has a memory that stores a theme associated with the virtual reality environment and a timeline associated with the theme. The timeline has a plurality of time-based intervals that each correspond to content for the theme. The processor alters the virtual reality environment to correspond to the content for the theme associated with a time-based interval selected by the user via the geometrically-shaped object through the receiver when the user is immersed in the virtual reality environment.

20 Claims, 10 Drawing Sheets

VIRTUAL REALITY EXPERIENCE CONTROL SYSTEM

BACKGROUND

1. Field

This disclosure generally relates to the field of user experiences. More particularly, the disclosure relates to a virtual reality ("VR") environment.

2. General Background

Current VR configurations typically allow a user to wear a VR headset in which a user can view a virtual environment. Such configurations provide the user with various simulated features (e.g., imagery, audio, etc.) so that the user has a realistic sense of being present within the virtual environment. For example, the user may move around within the virtual environment as if the user was, in reality, present within a real environment corresponding to that virtual environment. Yet, current configurations do not allow for user control of the particular virtual environment once the user is in that virtual environment. For example, a user that may want to alter the virtual environment would have to remove the VR headset, provide an input in a real world environment to a VR system to change the virtual environment, and then inconveniently place the VR headset on once again to resume the VR experience in the altered virtual environment. By having to shift between a virtual environment and a real world environment to alter the virtual environment, the quality of the VR experience is diminished.

SUMMARY

In one aspect, a virtual reality system has a virtual reality headset having an interior display screen that displays a virtual reality environment. Further, the virtual reality headset has a receiver, in operable communication with the virtual reality headset, that receives one or more user inputs from a user immersed in the virtual reality environment when wearing the virtual reality headset. In addition, the virtual reality headset has a memory that stores a theme associated with the virtual reality environment and a timeline associated with the theme. The timeline has a plurality of time-based intervals that each correspond to content for the theme.

The virtual reality headset also has a processor that generates the virtual reality environment and a geometrically-shaped object positioned within the virtual reality environment. The processor alters the virtual reality environment to correspond to the content for the theme associated with a time-based interval selected by the user via the geometrically-shaped object through the receiver when the user is immersed in the virtual reality environment.

In another aspect, a computer program product comprises a non-transitory computer readable storage device having a computer readable program stored thereon. The computer readable program when executed on a computer causes the computer to perform the functionality of the virtual reality headset described herein. In yet another aspect, a process performs the functionality of the virtual reality headset described herein.

BRIEF DESCRIPTION OF THE DRAWINGS

The above-mentioned features of the present disclosure will become more apparent with reference to the following description taken in conjunction with the accompanying drawings, wherein like reference numerals denote like elements and in which.

DETAILED DESCRIPTION

A configuration for controlling a VR experience within a VR environment is provided. A theme (e.g., room, object, character, movie, television show, video game, etc.) may be associated with the VR experience. Further, the theme may have a corresponding timeline. Accordingly, the configuration allows a user immersed within the VR experience to provide one or more inputs based on the timeline to a VR system to alter the VR experience. As an example, the user may provide the one or more inputs through a geometrically-shaped object in the VR experience. As a result of the user not having to shift between the VR experience and the real world (i.e., removing the VR headset), the quality of the user experience is improved.

Figure 1:
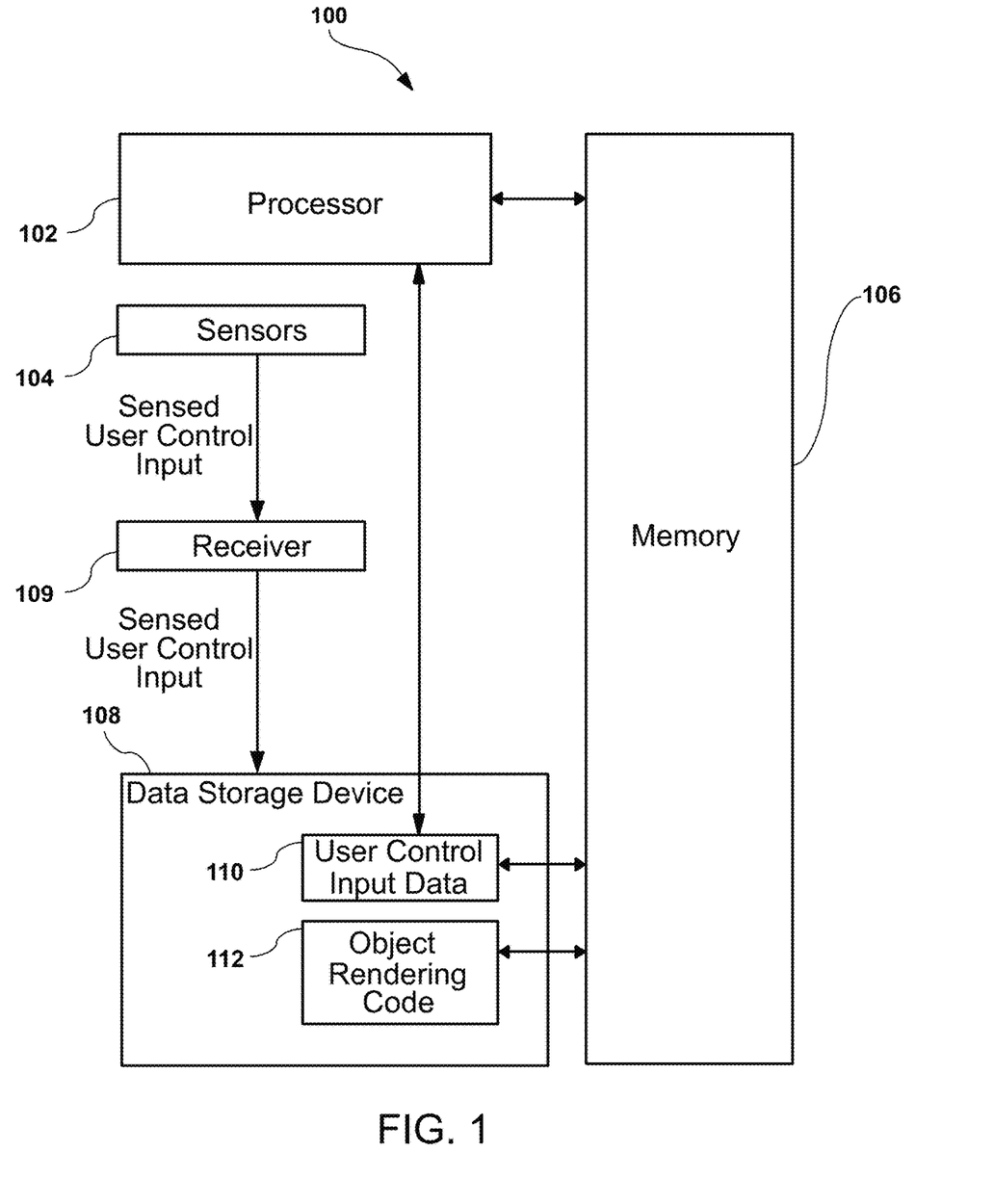
FIG. 1 illustrates a VR experience control system that is used to generate a VR environment and a theme associated with that environment.

FIG. 1 illustrates a VR experience control system 100 that is used to generate a VR environment and a theme associated with that environment. In one aspect, the VR experience control system 100 is a user experience device that provides a user with a user experience. For example, the VR experience control system 100 may be a VR headset, a VR console in communication with a VR headset, etc.

As illustrated, the VR experience control system 100 comprises a processor 102, a memory 106, e.g., random access memory ("RAM") and/or read only memory ("ROM"), a data storage device 108, and various sensors 104. The sensors 104 may sense various inputs (e.g., gestures) from the user within the VR experience. Examples of the sensors 104 include cameras, accelerometers, gyroscopes, joysticks, biometric sensors, infrared ("IR") sensors, smart watches, mobile devices, clothes, bracelets, fitness bands, necklaces, etc. The sensors 104 may store the sensed data, directly or indirectly, in the data storage device 108 and/or the memory 106. As an example of the sensed data, a user control input to change the timeline of the theme associated with the VR experience may be sensed from the user.

In one aspect, the sensors 104 are integrated within the VR experience control system 100. In another aspect, the sensors 104 are not integrated within the VR experience control system 100, but are in operable communication with the VR experience control system 100; such operable communication may be direct and/or indirect communication. For example, a sensor 104 may send data directly to the VR experience control system 100 (e.g., the sensor 104 is in close proximity to the VR experience control system 100), or data may be aggregated via a cloud service from the sensor 104 (e.g., a remote sensor 104) for retrieval by the VR experience control system 100. For instance, a sensor 104 may send the sensed data to a receiver 109 of the VR experience control system 100 that may or may not be remotely located from the sensor 104, or the sensor 104 may act as a receiver 109 that is integrated within the VR experience control system 100.

Further, the data storage device 108 and/or the memory 106 may store the sensed data as user control input data 110. In addition, the data storage device 108 and/or the memory 106 may store object rendering code 112 that may be used by the processor 102 to render various objects within the VR environment. For instance, the processor 102 may use the object rendering code 112 to render a geometrically-shaped object within the VR environment while the user is present within that VR environment. The processor 102 may then use the user control input data 110, which is associated with user inputs provided by the user to that geometrically-shaped object in the VR environment, to alter the VR environment.

In one aspect, the data storage device 108 loads the object rendering code 112 from a computer readable storage device, e.g., a magnetic or optical drive, diskette, or non-volatile memory, DVD, CD-ROM, etc. In another aspect, the data storage device 108 is the computer readable storage device. As such, the object rendering code 112 and associated data structures of the present disclosure may be stored on a computer readable storage device.

The VR experience control system 100 improves the functioning of a computing device by reducing the processing time that a VR system uses to receive user inputs to change a VR experience. As the VR experience control system 100 has a user input system built into the VR experience itself, user inputs may be provided to the processor 102 from the sensors 104 much faster than conventional VR systems that have a user removing a VR headset to provide an input to a VR system to change a VR environment.

Although the components of the VR experience control system 100 are illustrated in FIG. 1 as being integrated within one device, the components may alternatively communicate with each other remotely through a network connection. For example, the processor 102 may be stored on a remote server that communicates with a VR headset and the sensors 104 stored in a wearable device worn by the user. Alternatively, the processor 102 may be built into a sensor 104 itself and communicate with the VR headset via the sensor 104. For example, the processor 102 may be integrated into a sensor 104 of a wearable device (e.g., headset, watch, bracelet, etc.) or an adjoining apparatus of the wearable device that is in operable communication with the VR headset. As yet another example, the processor 102 may be integrated into a wearable device, but the sensor 104 may be a distinct device that communicates, indirectly (through the receiver 109) or directly, with the processor 102. As another example, the sensor 104 may be built into a non-wearable device such as a camera that also has an integrated processor 102 that communicates with a VR headset.

Figure 2:
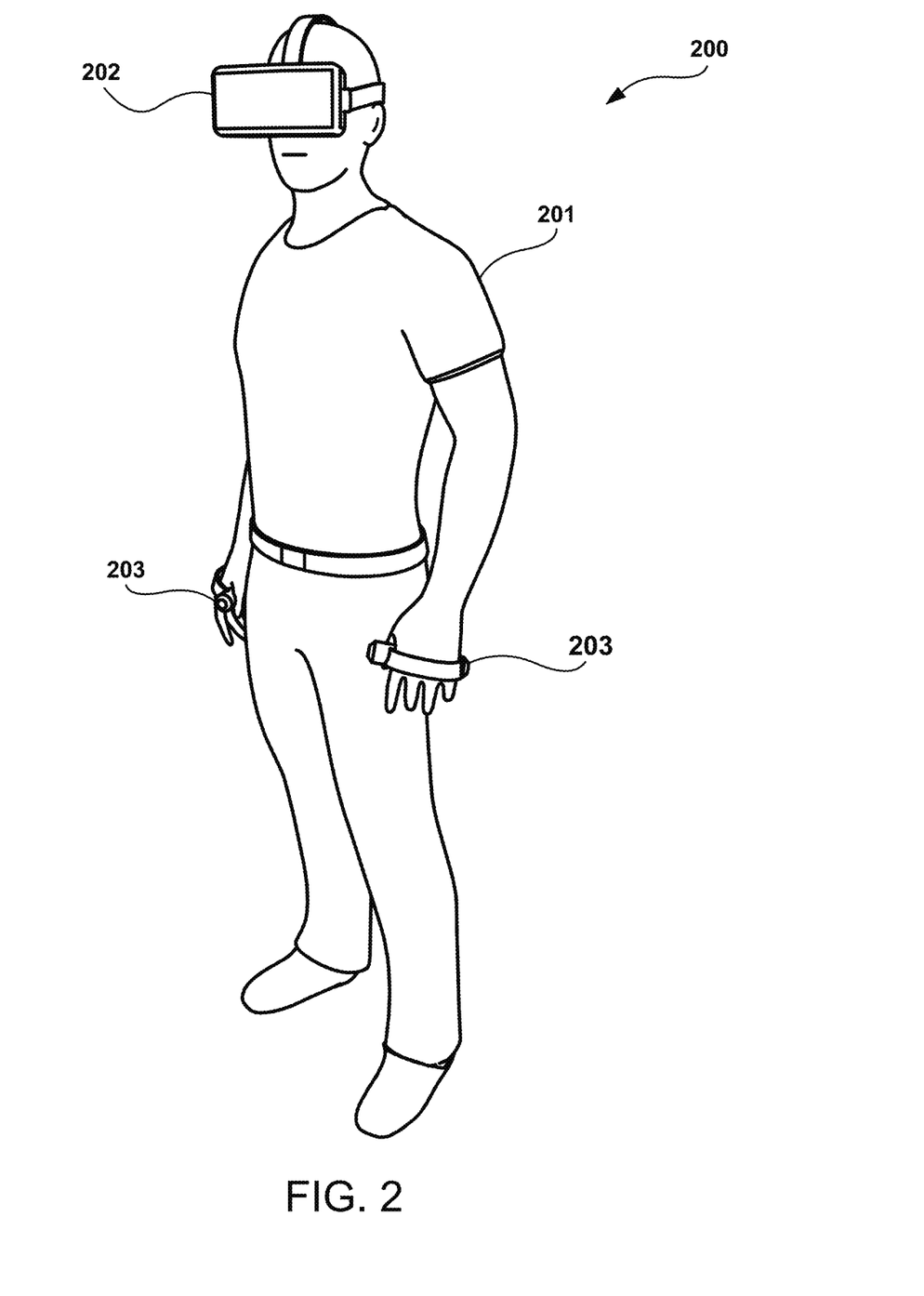
FIG. 2 illustrates an example of a VR device that provides a VR user experience.

FIG. 2 illustrates an example of a VR device that provides a VR user experience. A VR configuration 200 in which a user 201 uses a head-mounted VR device 202 to view a VR environment is illustrated. In one aspect, the components of the VR experience control system 100 (FIG. 1) are built into the head-mounted VR device 202. In another aspect, some of the components of the VR experience control system 100 are built into the head-mounted VR device 202 whereas other components are separate components that are in operable communication with the head-mounted VR device 202. For example, the head-mounted VR device 202 may have an interior display within the head-mounted VR device 202 that displays a VR environment, but may be in operable communication with one or more hand-held user input devices 203 (e.g., wands) that the user 201 uses to provide inputs within the VR environment to adjust the VR experience. For example, the hand-held user input devices 203 may sense that the user 201 has provided a gesture with respect to a geometrically-shaped object within the VR environment to request a change to the VR environment. A variety of input devices may be used instead of the hand-held user input devices 203 (e.g., wearable sensors).

Figure 3:
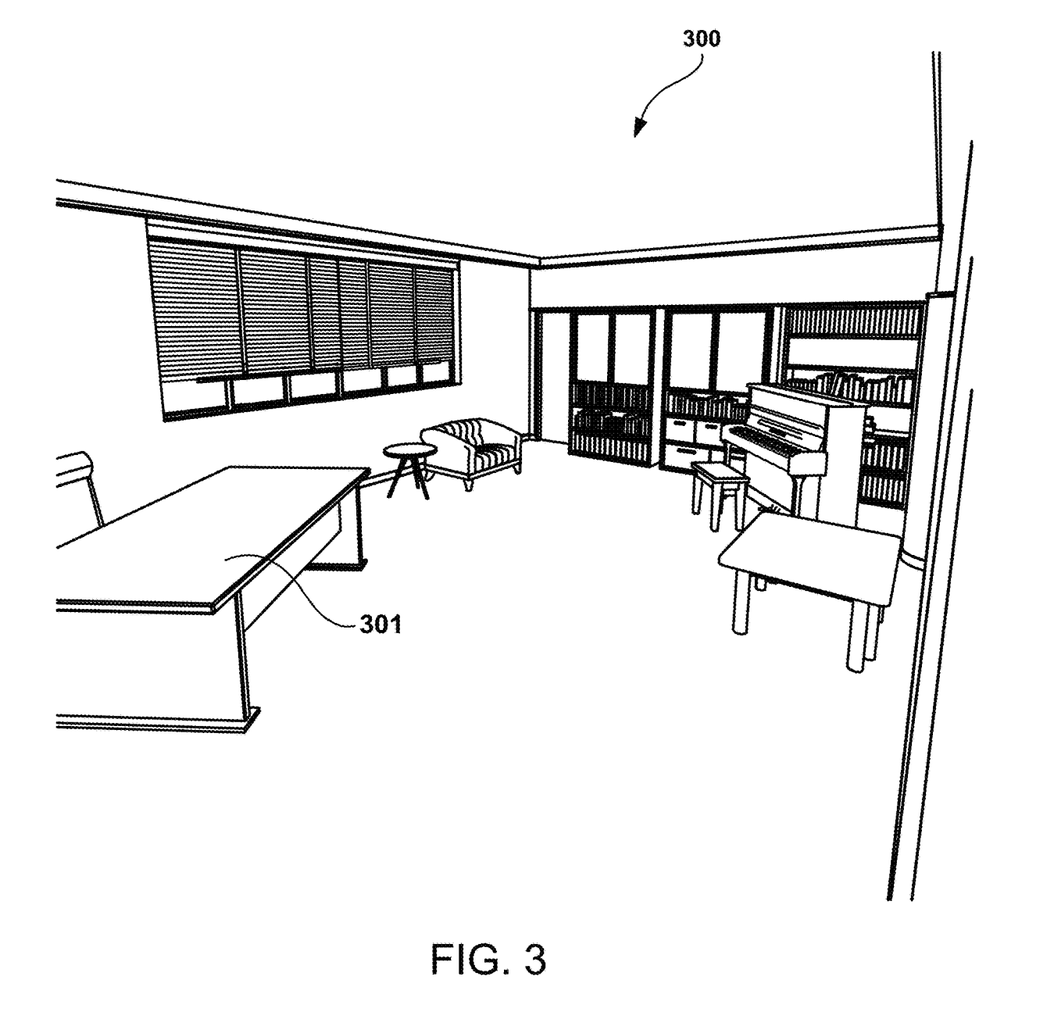
FIG. 3 illustrates an example of a VR experience that is displayed on the display screen positioned within the head-mounted VR device illustrated in FIG. 2.

Further, FIG. 3 illustrates an example of a VR experience 300 that is displayed on the display screen positioned within the head-mounted VR device 202 illustrated in FIG. 2. As an example, the user 201 is immersed into a VR experience associated with a room associated with a particular time period. For instance, the room may have a desk 301, various other furniture, decorations, etc. associated with that room during the corresponding time period. The user 201 may move around that room to get a realistic experience of the appearance of that room.

The room illustrated in FIG. 3 is provided only as an example. Various other locations, landscapes, scenery, etc. may be used instead to provide the VR experience 300.

The user 201 may want to alter the VR experience 300 illustrated in FIG. 3 without having to remove the head-mounted VR device 202 illustrated in FIG. 2. For instance, the user 201 may want to view the history of the appearance of the room illustrated in FIG. 3. Accordingly, the user 201 may provide an input through a sensor 104 (e.g., via hand-held user wands 203, wearable device, etc.) to indicate that the user wants to modify the VR experience 300 from within the VR experience 300.

Figure 4A:
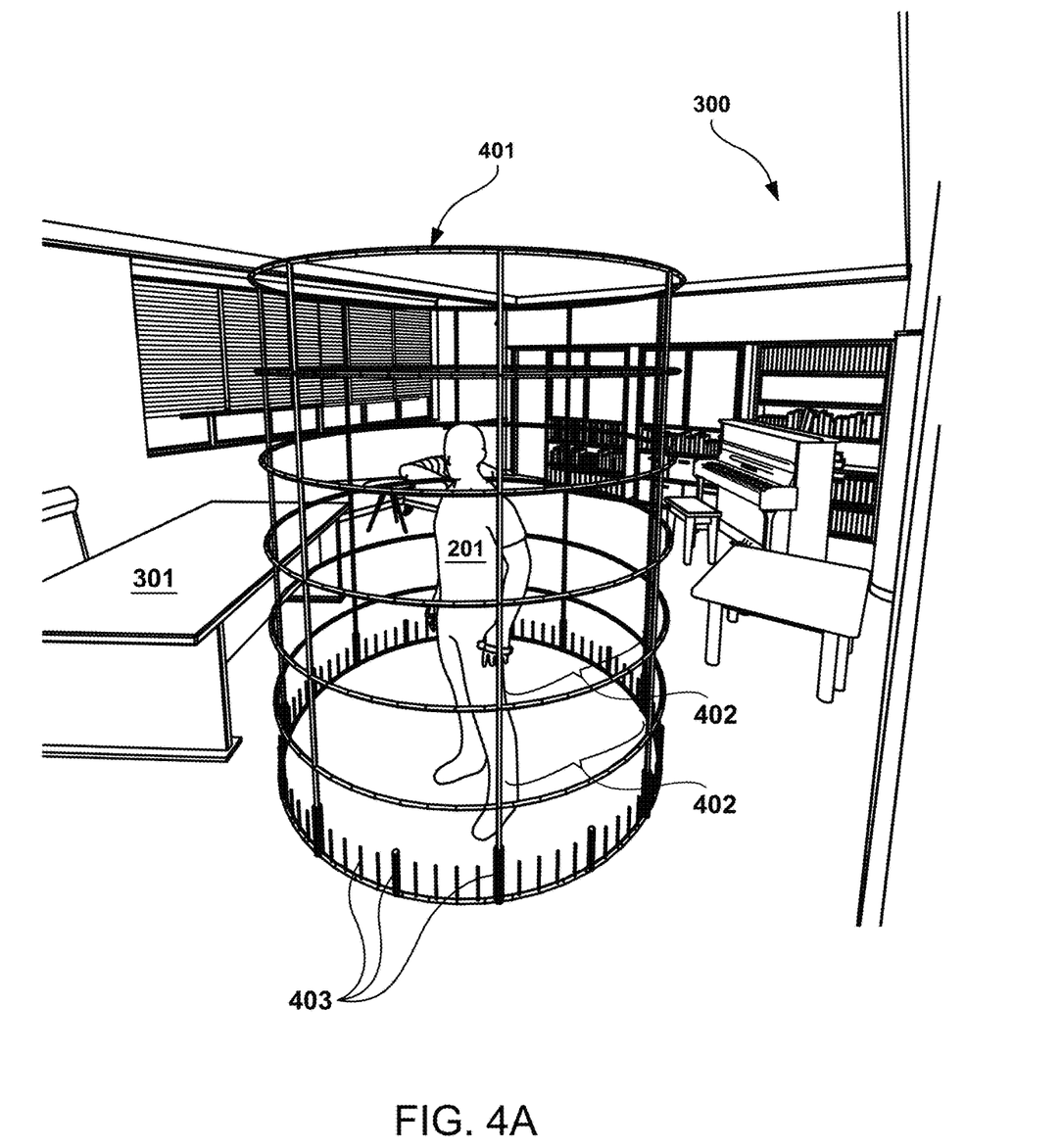
FIG. 4A illustrates a virtual geometrically-shaped object that is displayed within the VR experience after the user requests a modification to the VR experience.

Accordingly, FIG. 4A illustrates a virtual geometrically-shaped object 401 (e.g., a cylinder) that is displayed within the VR experience 300 after the user requests a modification to the VR experience 300. For illustrative purposes, an avatar of the user 201 is illustrated within the room to depict the position of the user within the room even though the user 201 will typically not view such an avatar within the VR experience (i.e., the user 201 will typically view the room and possibly avatar portions such as hands, feet, etc.). Further, various other geometric shapes other than a cylinder may be used for the virtual geometrically-shaped object 401.

The virtual geometrically-shaped object 401 is illustrated in the VR experience 300 as an empty wireframe to depict the structure of the virtual geometrically-shaped object 401 as having sections 402 for data (e.g., text, pictures, etc.) to be displayed to the user. Further, the virtual geometrically-shaped object 401 has a plurality of incremental markers 403; each of which represents a time increment for a particular time period (e.g., an incremental marker for each day in a week, each day in a year, each month in a year, each year in a decade, each year in a century, each decade in a century, etc.).

The user is able to turn the virtual geometrically-shaped object 401 (e.g., via the hand-held user wands 303, gestures (such as swipes) detected by the sensors 104, etc.) to a particular time increment, view content associated with that time increment in a corresponding section 402, and select the content so that the VR experience 300 is changed to reflect the time period associated with the time increment— all while the user 201 is immersed in the VR experience 300 without removal of the head-mounted VR device 202.

In one aspect, as illustrated in FIG. 4A, the virtual geometrically-shaped object 401 surrounds the user 201. For example, the user 201 may provide an input (e.g., via the hand-held user wands 203, gestures detected by the sensors 104, etc.) to initiate a display of the virtual geometrically-shaped object 401 around the user 201. The user 201 may then move (e.g., spin) the virtual geometrically-shaped object 401 until the virtual geometrically-shaped object 401 reaches an intended time increment associated with an incremental marker 403. The user 201 may provide various inputs (e.g., via the hand-held user wands 303, gestures detected by the sensors 104, etc.) to move or stop the virtual geometrically-shaped object 401, select content from the sections 402 displayed on the interior of the virtual geometrically-shaped object 401, change the granularity of the incremental markers 403 (e.g., days to months), etc. For example, a gesture having a hand speed that exceeds the speed of a predetermined hand speed threshold may be used to change the granularity of the incremental markers 403; whereas a gesture having a lesser hand speed may be used to move the virtual geometrically-shaped object 401 with the current incremental markers 403.

Similarly, the user 201 may also provide an input (e.g., via the hand-held user wands 203, gestures detected by the sensors 104, etc.) to remove the virtual geometrically-shaped object 401 from the VR experience after the selection of the change to the VR experience so that the user 201 may be immersed within the VR experience without viewing the virtual geometrically-shaped object 401.

In another aspect, the user 201 is positioned on the exterior of the virtual geometrically-shaped object 401. Accordingly, the sections 402 are also displayed on the exterior of the virtual geometrically-shaped object 401 so that the user 201 may access the sections 402.

The VR experience 300 is depicted in FIGS. 3 and 4A with the desk 301 not having any items on its top portion. The reason for such depiction is that the time period associated with the room illustrated in the VR experience 300 did not have any items on the desk 301. Other time periods may or may not have items on the desk 301, different furniture, different decorations, etc.

Figure 4B:
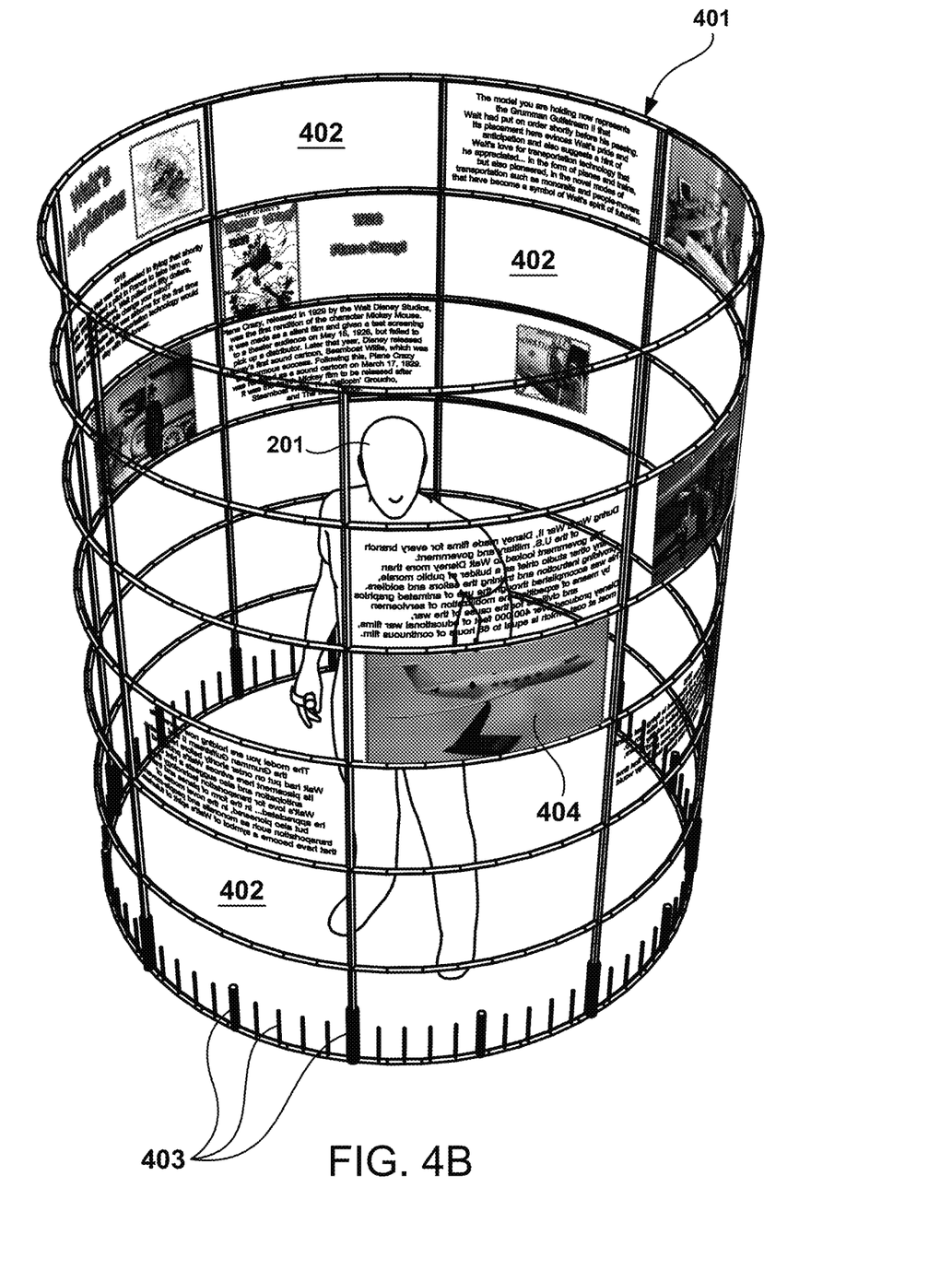
FIG. 4B illustrates an isolated view of the virtual geometrically-shaped object with content depicted in various sections.

FIG. 4B illustrates an isolated view of the virtual geometrically-shaped object 401 with content depicted in various sections 402. As illustrated, the user 201 can view various text, pictures, etc. associated with one or more of the incremental markers 403. As an example, one of the sections 402 illustrates a picture 404 of a plane. For ease of illustration, FIG. 4C illustrates the virtual geometrically-shaped object 401 positioned within the VR experience 300 with only some of the pictures being displayed even though the additional pictures and text illustrated in FIG. 4B may also be displayed.

Figure 4C:
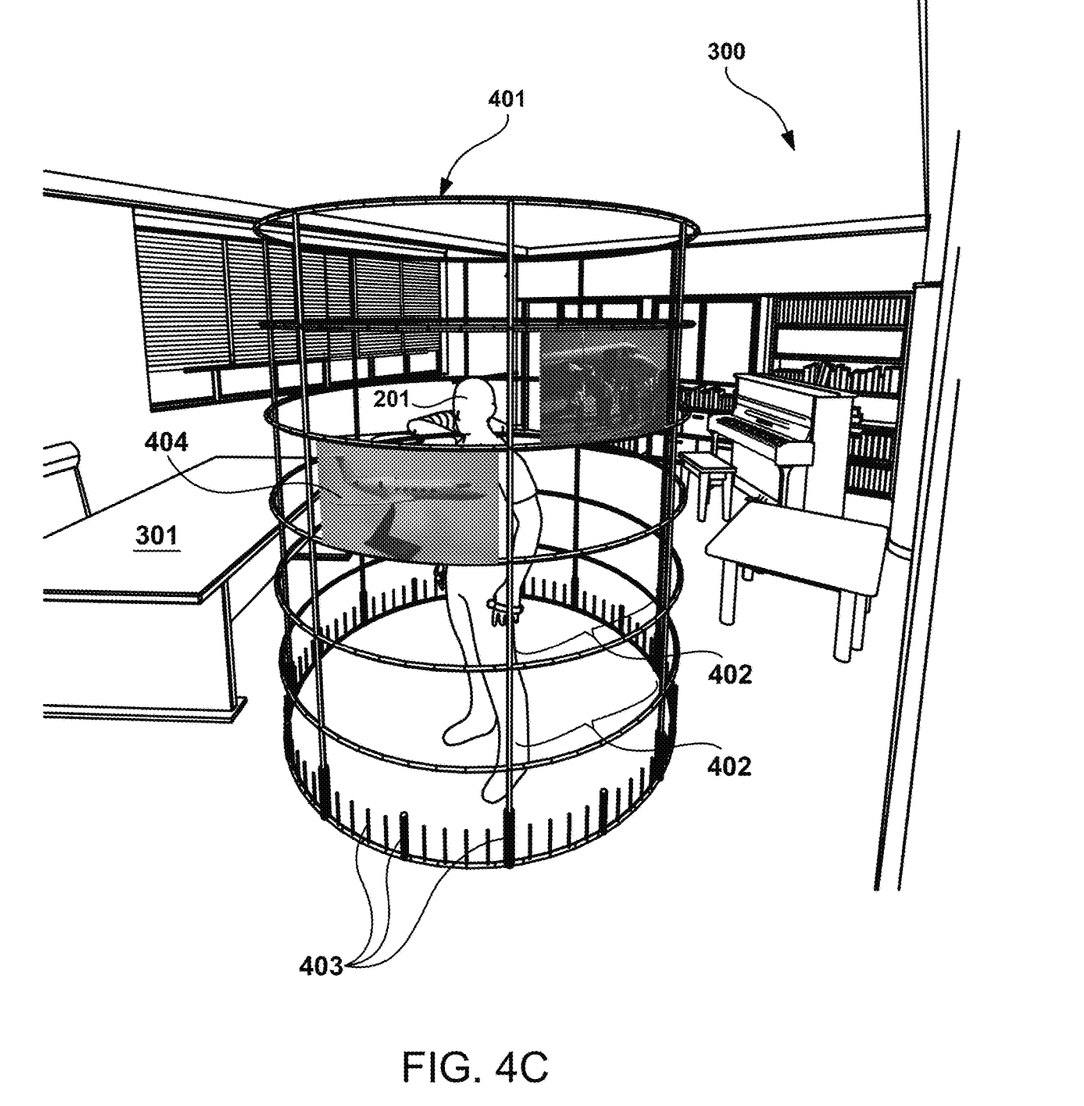
FIG. 4C illustrates the virtual geometrically-shaped object positioned within the VR experience with only some of the pictures being displayed.
Figure 4D:
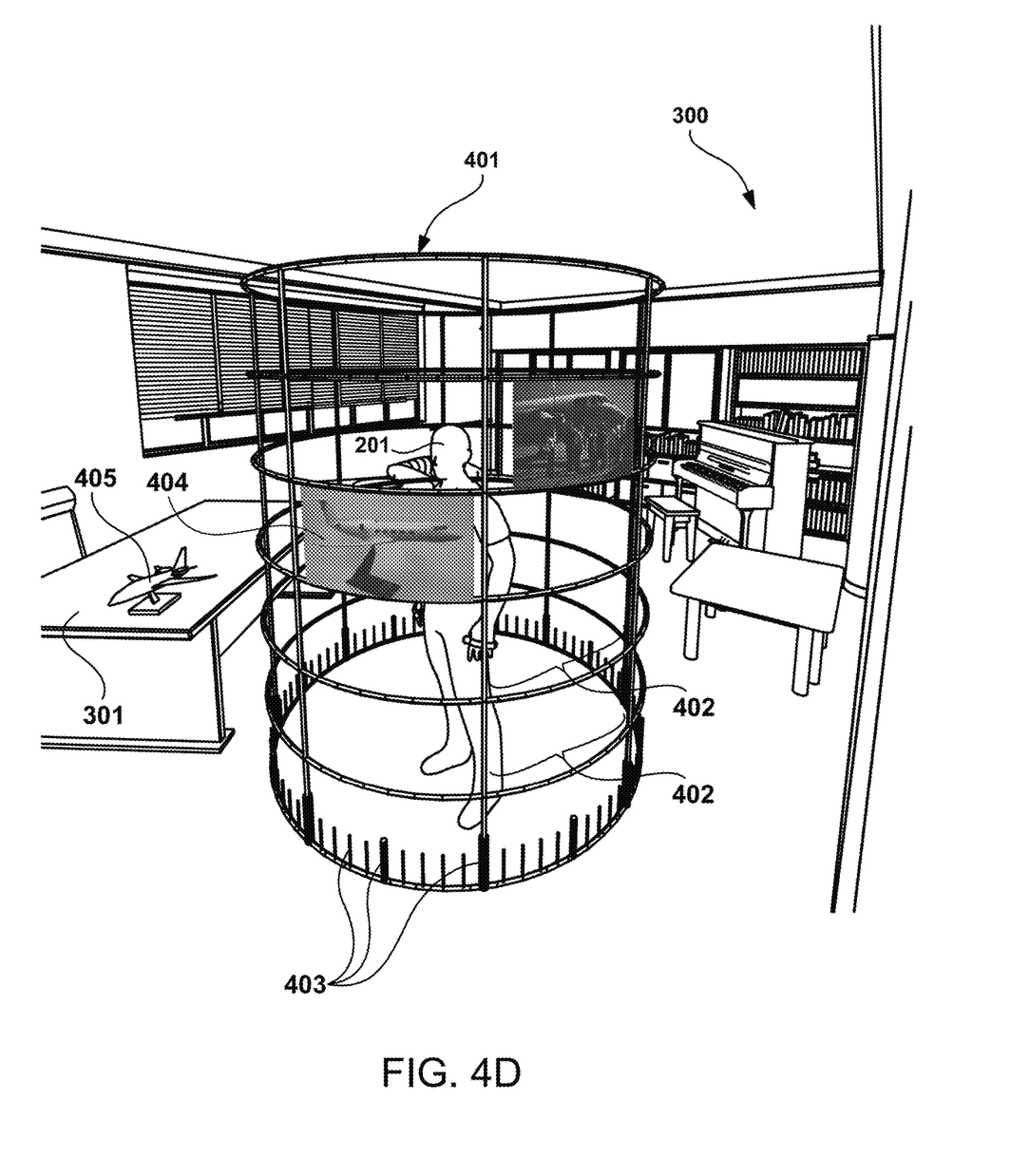
FIG. 4D illustrates the VR experience with a miniature replica of a plane being positioned on a desk.

The user 201 may select the picture 404 of the plane illustrated in FIG. 4C to view the VR experience 300 after a miniature replica 405 of the plane is positioned on the desk 301. As a result, the processor 102 (FIG. 1) modifies the VR experience 300 displayed on the interior display of the head-mounted VR device 202 to display the miniature replica 405 of the plane being positioned on the desk 301. FIG. 4D illustrates the VR experience 300 with the miniature replica 405 of the plane being positioned on the desk 301.

The example of the miniature replica 405 of the plane being positioned on the desk 301 is a simplified example of the VR experience 300 being modified by the user 201 in the VR experience 300 that is provided to illustrate the workings of the VR experience control system 100 (FIG. 1). The VR experience 300 may be substantially changed via the selection of different time periods by the user 201 (e.g., different furniture, different decorations, different objects, different window view, etc.). In other words, the VR experience control system 100 may be used to modify a theme that corresponds to a time-based interval. In one aspect, that theme is a room, and the content corresponding to the plurality of time-based intervals each include an appearance of the room associated with a particular time in the timeline as illustrated in FIGS. 4A, 4C, and 4D.

In another aspect, the theme is a character from media content (e.g., movie, television show, video game, etc.). The VR experience control system 100 is then used to modify the VR experience 100 to depict different scenery associated with the character based on a timeline associated with the character. For example, the character may be present in a plurality of different movies. The virtual geometrically-shaped object 401 may display different scenery in the sections 402 from all of those movies in a timeline sequence via the incremental markers 403. The user 201 may then change the VR experience 300 to be immersed in different scenes according to the timeline of the character. For instance, the user 201 may be immersed within an exterior scene according to one incremental marker 403 and then be immersed within an interior scene after a change to a different incremental marker 403 requested by the user 201 via the virtual geometrically-shaped object 401.

In another aspect, the theme is a timeline for photographs and/or videos. The VR experience 300 may be a viewing room (e.g., movie theater) in which a virtual display device displays photographs and/or videos based upon a user selection from the virtual geometrically-shaped object 401. In yet another aspect, the theme is a timeline for media consumption. For example, the user may select a television show to watch in the viewing room; the selection may be performed based on a time sequence of a corresponding television show series. Various other forms of content may be selected by the user 201 to modify a theme based on a timeline such that an entirety or a portion of a VR experience is modified according to a change in time period.

Figure 4E:
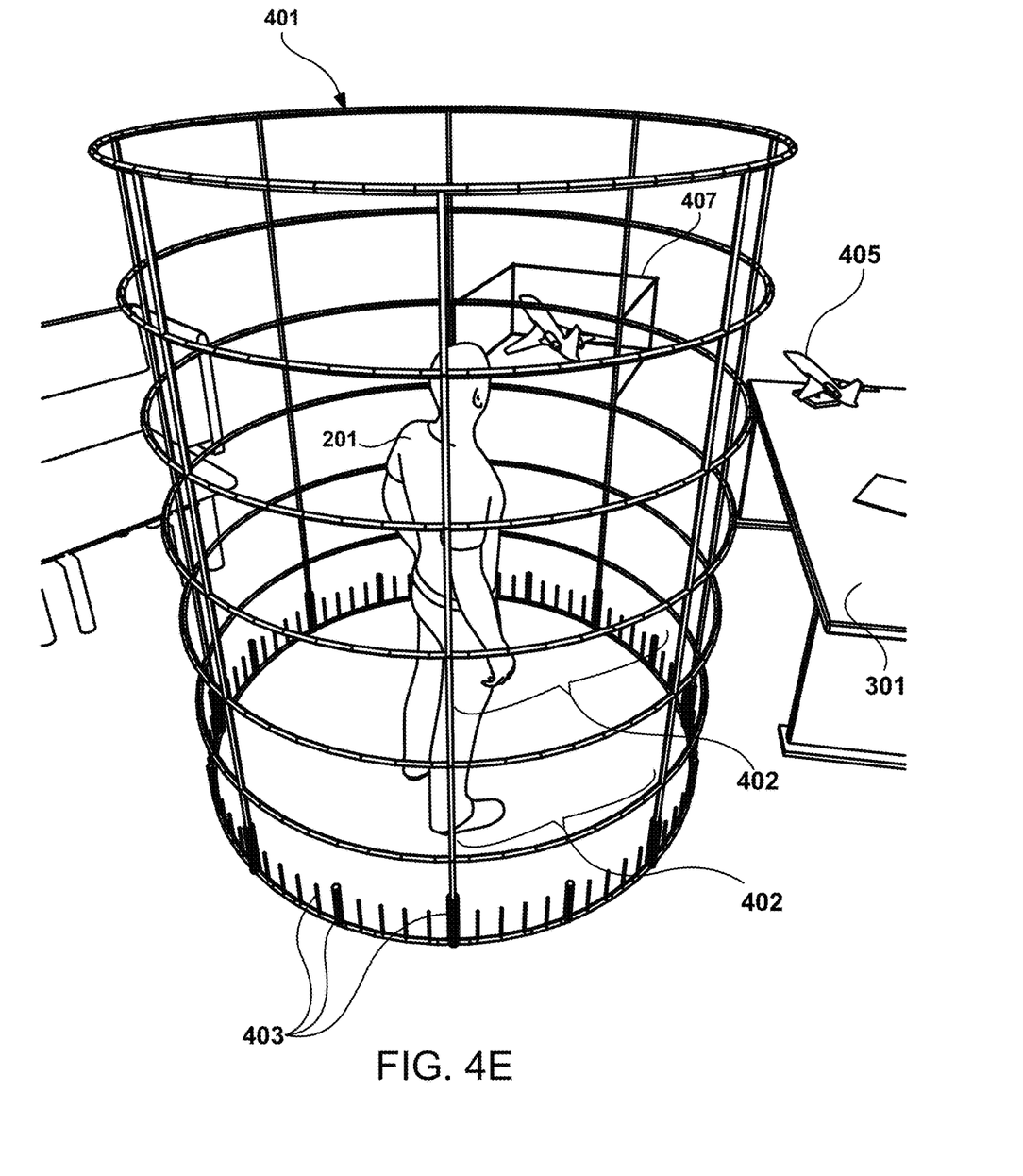
FIG. 4E illustrates a section of the virtual geometrically-shaped object depicting a three-dimensional image.

In yet another aspect, the sections 402 may illustrate three-dimensional images instead of, or in addition to, two-dimensional images. FIG. 4E illustrates a section 402 of the virtual geometrically-shaped object 401 depicting a three-dimensional image 407. For example, the three-dimensional image 407 may be a three-dimensional image of the plane rather than the two-dimensional picture illustrated in FIG. 4D.

The section 402 may extend outwardly from the virtual geometrically-shaped object 401 away from the user 201 to accommodate the three-dimensional image 407. As an example, the section 402 may be a three-dimensional box, or other container, that includes the three-dimensional image 407. Alternatively, the section 402 may extend inwardly within the virtual geometrically-shaped object 401 toward the user 201 to accommodate the three-dimensional image 407. Further, the three-dimensional image 407 may be part of a three-dimensional movie, video clip, preview, documentary, etc.

Figure 4F:
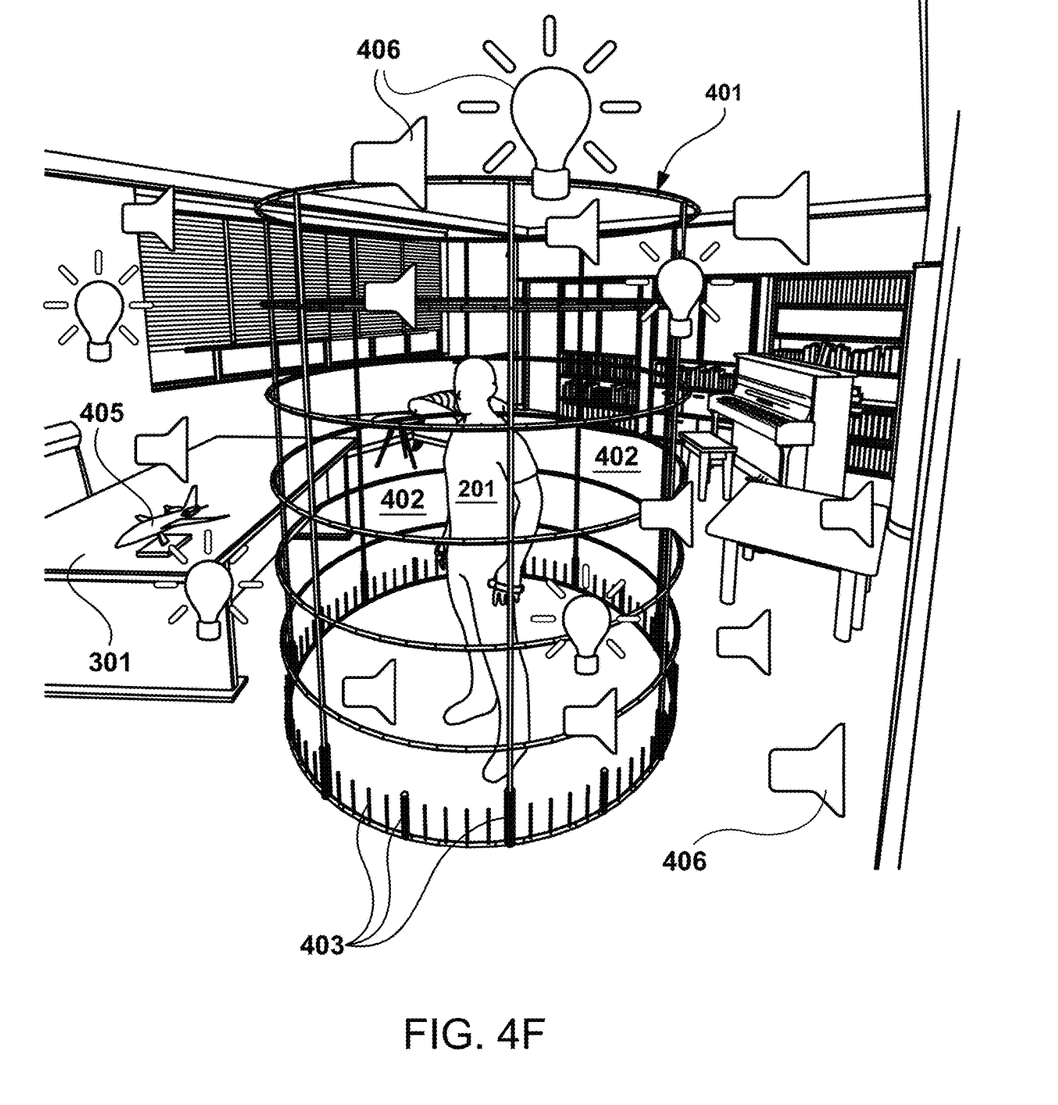
FIG. 4F illustrates various display and audio effects that may be associated with various items in the VR experience.

FIG. 4F illustrates various display and audio effects 406 that may be associated with various items in the VR experience 300. Indicia for such audio effects 406 may be displayed for the user 201 so that the user 201 may approach an item or location associated with the effect 406; the user 201 may then provide an input to the effect (e.g., via the hand-held user wands 203, gestures detected by the sensors 104, etc.) to consume the effect (e.g., move an object, see an image or video, listen to information about a corresponding item, etc.).

Figure 5:
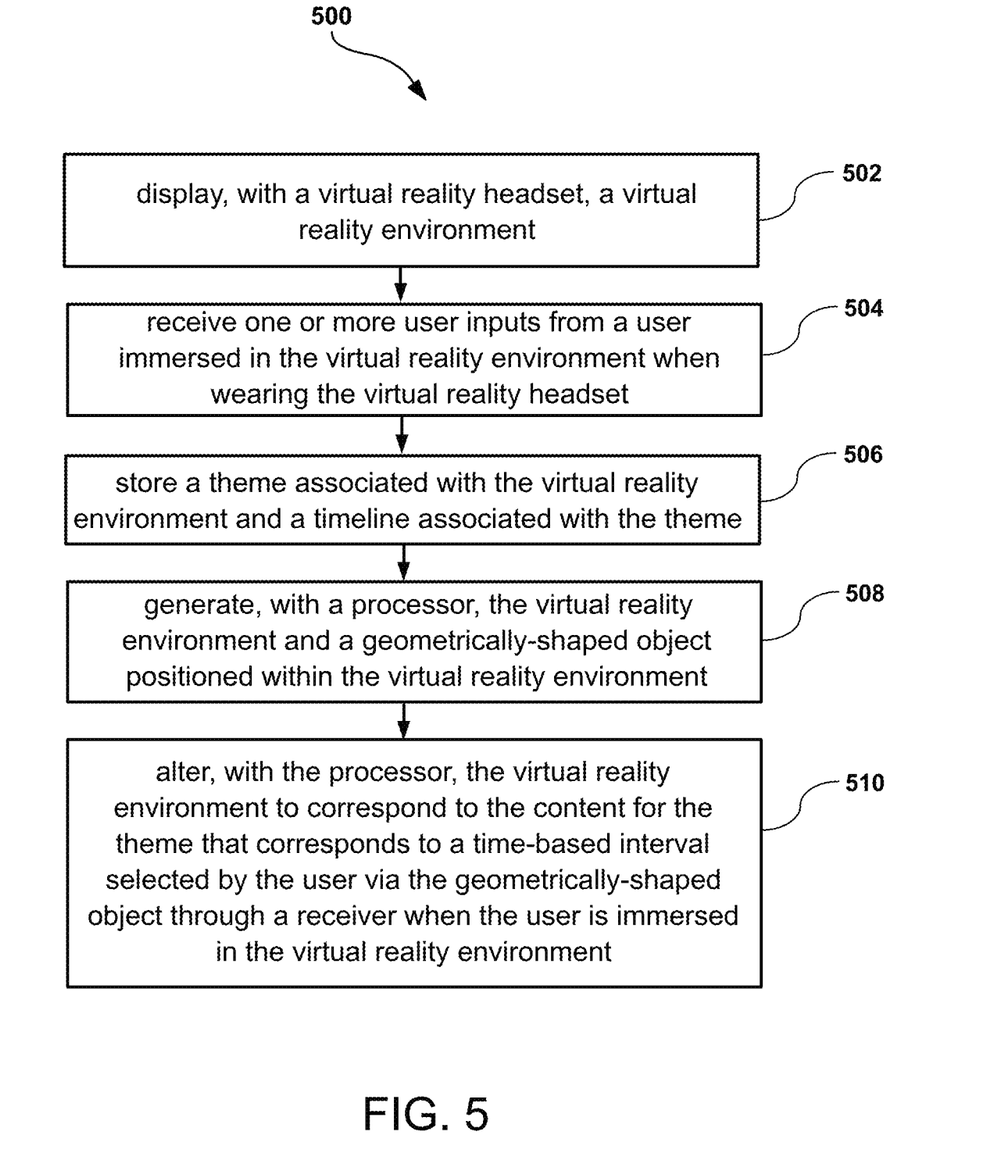
FIG. 5 illustrates a process that is used by the VR experience control system to modify the VR experience based on an input provided by the user to the virtual geometrically-shaped object within the VR experience.

Various processes may be used to alter the VR experience 300 illustrated in FIG. 3. FIG. 5 illustrates a process 500 that is used by the VR experience control system 100 (FIG. 1) to modify the VR experience 300 based on an input provided by the user 201 (FIG. 2) to the virtual geometrically-shaped object 401 (FIG. 4A) within the VR experience 300. At a process block 502, the process 500 displays, with a virtual reality headset 202, a virtual reality environment 300. Further, at a process block 504, the process 500 receives one or more user inputs from the user 201 immersed in the virtual reality environment 300 when wearing the virtual reality headset 202. In addition, at a process block 506, the process 500 stores a theme associated with the VR environment 300 and a timeline associated with the theme. The timeline has a plurality of time-based intervals 403 that each correspond to content for the theme. At a process block 508, the process 500 also generates, with the processor 102 (FIG. 1), the virtual reality environment and a geometrically-shaped object positioned within the virtual reality environment. Further, at a process block 510, the process 500 alters, with the processor 102, the VR environment 300 to correspond to the content for the theme that corresponds to a time-based interval 403 selected by the user 201 via the geometrically-shaped object 401 through the receiver 109 when the user 201 is immersed in the virtual reality environment 300.

The processes described herein may be implemented in a specialized processor. Such a processor will execute instructions, either at the assembly, compiled or machine-level, to perform the processes. Those instructions can be written by one of ordinary skill in the art following the description of the figures corresponding to the processes and stored or transmitted on a computer readable medium. The instructions may also be created using source code or any other known computer-aided design tool. A computer readable medium may be any medium, e.g., computer readable storage device, capable of carrying those instructions and include a CD-ROM, DVD, magnetic or other optical disc, tape, silicon memory (e.g., removable, non-removable, volatile or non-volatile), packetized or non-packetized data through wireline or wireless transmissions locally or remotely through a network. A computer is herein intended to include any device that has a specialized, general, multi-purpose, or single purpose processor as described above. For example, a computer may be a desktop computer, laptop, smartphone, tablet device, set top box, etc.

It is understood that the apparatuses, systems, computer program products, and processes described herein may also be applied in other types of apparatuses, systems, computer program products, and processes. Those skilled in the art will appreciate that the various adaptations and modifications of the aspects of the apparatuses, systems, computer program products, and processes described herein may be configured without departing from the scope and spirit of the present apparatuses, systems, computer program products, and processes. Therefore, it is to be understood that, within the scope of the appended claims, the present apparatuses, systems, computer program products, and processes may be practiced other than as specifically described herein.

We claim:

1. A virtual reality system comprising:
   a virtual reality headset having an interior display screen that displays a virtual reality environment, the virtual reality environment comprising scenery and a geometrically-shaped object;
   a receiver, in operable communication with the virtual reality headset, that receives one or more user inputs, via the geometrically-shaped object, to alter the scenery, the one or more user inputs being received from a user immersed in the virtual reality environment when wearing the virtual reality headset;
   a memory that stores a theme associated with the virtual reality environment and a timeline associated with the theme, the timeline having a plurality of time-based intervals that each correspond to content for the theme; and
   a processor that generates the virtual reality environment, the geometrically-shaped object positioned within the virtual reality environment, and the plurality of time-based intervals positioned at least partially around a periphery of the geometrically-shaped object, the processor altering the scenery in the virtual reality environment to correspond to the content for the theme that corresponds to a time-based interval selected by the user from the plurality of time-based intervals via the geometrically-shaped object when the user is immersed in the virtual reality environment.

2. The virtual reality system of claim 1, wherein the geometrically-shaped object surrounds the user in the virtual reality environment.

3. The virtual reality system of claim 1, wherein the geometrically-shaped object has an exterior portion that is accessible by the user in the virtual reality environment.

4. The virtual reality system of claim 1, wherein the geometrically-shaped object is a cylinder.

5. The virtual reality system of claim 1, wherein the theme is a room, and the content corresponding to the plurality of time-based intervals each comprise an appearance of the room associated with a particular time in the timeline.

6. The virtual reality system of claim 1, wherein the theme is a character from media content, and the content corresponding to the plurality of time-based intervals each comprise a scene from the media content associated with a particular time in the timeline for the character in the media content.

7. The virtual reality system of claim 1, wherein the receiver recognizes one or more gestures of the user with respect to the geometrically-shaped object in the virtual environment.

8. The virtual reality system of claim 7, wherein a first gesture from the one or more gestures corresponds to a command to move the geometrically-shaped object in the virtual environment in increments according to the plurality of time-based intervals.

9. The virtual reality system of claim 8, wherein a second gesture from the one or more gestures corresponds to a command to stop the movement of the geometrically-shaped object in the virtual environment and select one of the plurality of time-based intervals.

10. The virtual reality system of claim 7, wherein a gesture from the one or more gestures corresponds to a command to change the granularity of the increments of the plurality of time-based intervals.

11. A computer program product comprising a non-transitory computer readable storage device having a computer readable program stored thereon, wherein the computer readable program when executed on a computer causes the computer to:
- display, with a virtual reality headset, a virtual reality environment, the virtual reality environment comprising scenery and a geometrically-shaped object;
- receive one or more user inputs, via the geometrically-shaped object, to alter the scenery, the one or more user inputs being received from a user immersed in the virtual reality environment when wearing the virtual reality headset;
- store a theme associated with the virtual reality environment and a timeline associated with the theme, the timeline having a plurality of time-based intervals that each correspond to content for the theme;
- generate, with a processor, the virtual reality environment, the geometrically-shaped object positioned within the virtual reality environment, and the plurality of time-based intervals positioned at least partially around a periphery of the geometrically-shaped object; and
- alter, with the processor, the scenery in the virtual reality environment to correspond to the content for the theme that corresponds to a time-based interval selected by the user from the plurality of time-based intervals via the geometrically-shaped object when the user is immersed in the virtual reality environment.

12. The computer program product of claim 11, wherein the geometrically-shaped object surrounds the user in the virtual reality environment.

13. The computer program product of claim 11, wherein the geometrically-shaped object has an exterior portion that is accessible by the user in the virtual reality environment.

14. The computer program product of claim 11, wherein the geometrically-shaped object is a cylinder.

15. The computer program product of claim 11, wherein the theme is a room, and the content corresponding to the plurality of time-based intervals each comprise an appearance of the room associated with a particular time in the timeline.

16. The computer program product of claim 11, wherein the theme is a character from media content, and the content corresponding to the plurality of time-based intervals each comprise a scene from the media content associated with a particular time in the timeline for the character in the media content.

17. The computer program product of claim 11, wherein the receiver recognizes one or more gestures of the user with respect to the geometrically-shaped object in the virtual environment.

18. The computer program product of claim 17, wherein a first gesture from the one or more gestures corresponds to a command to move the geometrically-shaped object in the virtual environment in increments according to the plurality of time-based intervals.

19. The computer program product of claim 18, wherein a second gesture from the one or more gestures corresponds to a command to stop the movement of the geometrically-shaped object in the virtual environment and select one of the plurality of time-based intervals.

20. A method comprising:
- displaying, with a virtual reality headset, a virtual reality environment, the virtual reality environment comprising scenery and a geometrically-shaped object;
- receiving one or more user inputs, via the geometrically-shaped object, to alter the scenery, the one or more user inputs being received from a user immersed in the virtual reality environment when wearing the virtual reality headset;
- storing a theme associated with the virtual reality environment and a timeline associated with the theme, the timeline having a plurality of time-based intervals that each correspond to content for the theme;
- generating, with a processor, the virtual reality environment, the geometrically-shaped object positioned within the virtual reality environment, and the plurality of time-based intervals positioned at least partially around a periphery of the geometrically-shaped object; and
- altering, with the processor, the scenery in the virtual reality environment to correspond to the content for the theme that corresponds to a time-based interval selected by the user from the plurality of time-based intervals via the geometrically-shaped object when the user is immersed in the virtual reality environment.

* * * * *